United States Patent Office 3,422,269
Patented Jan. 14, 1969

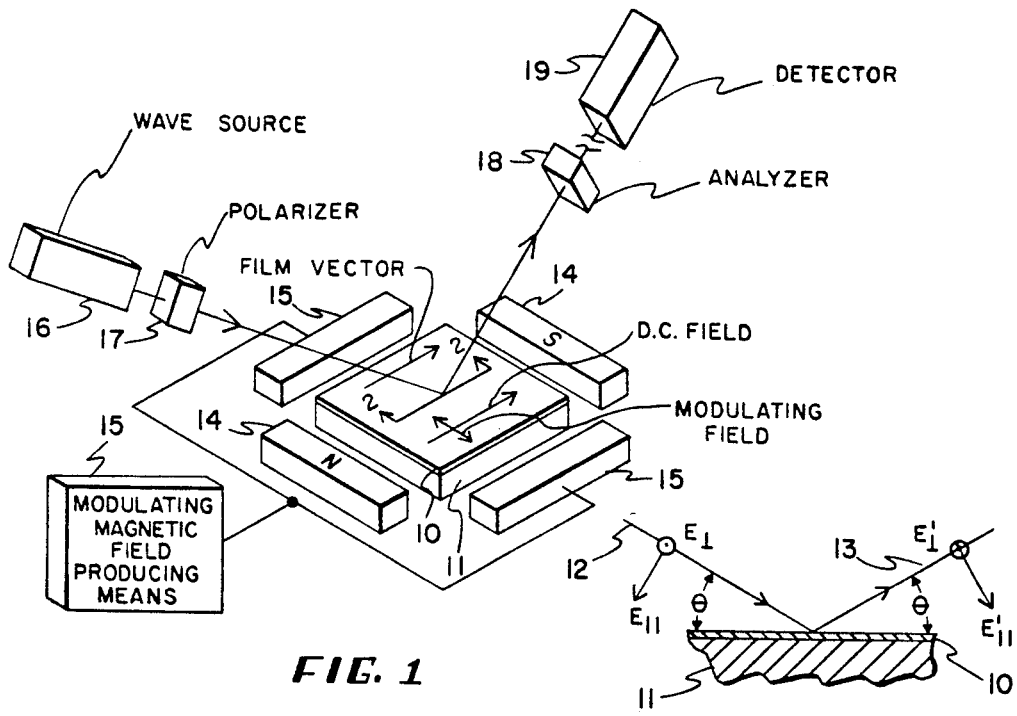
FIG. 1
FIG. 2
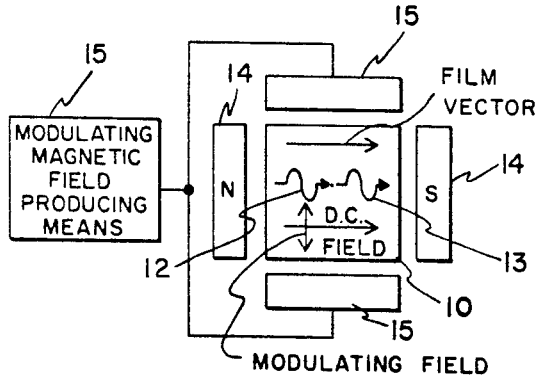
FIG. 3
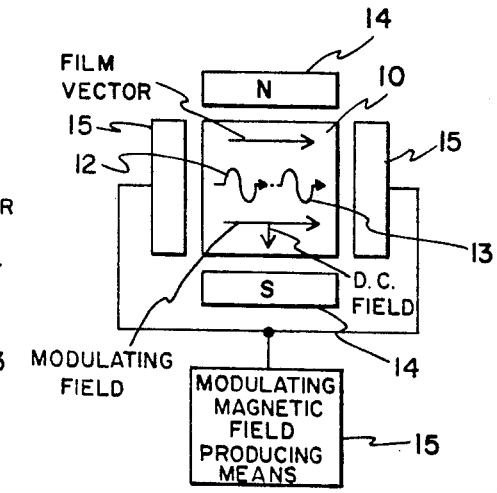
FIG. 4
INVENTOR.
DI CHEN

3,422,269
RESONANT KERR EFFECT ELECTROMAGNETIC
WAVE MODULATORS
Di Chen, Hopkins, Minn., assignor to Honeywell Inc.,
a corporation of Delaware
Filed Apr. 10, 1964, Ser. No. 358,844
U.S. Cl. 250—199                                    3 Claims
Int. Cl. H04b 9/00; G02f 1/28; G02f 1/36

The present invention relates to modulators for electromagnetic waves and more particularly to an apparatus for modulating a maser or laser output at microwave frequencies.

Many methods of modulating maser and laser outputs have been proposed. These schemes either have required high power or have not been capable of modulating at frequencies in the microwave region over a broad bandwidth. This invention overcomes both of these prior art difficulties.

The present invention utilizes the magneto-optical Kerr effect of certain magnetic films to modulate the direction of polarization of electromagnetic radiation reflected from a surface of the film. It has been found that a modulating magnetic field may be applied to these films to cause movement of an effective magnetic vector associated with the film crystal or crystals thereby causing variations in the electric field components of beams of electromagnetic energy reflected from a surface of the film. The reflected beam may then be passed through an analyzer and variations in intensity of the transmitted polarized beam detected. Two types of modulation can be achieved using the invention. They depend upon the position of the modulating field with respect to magnetic vectors of the crystals in the magnetic film. These two types are switching modulation and resonance modulation.

The invention will be more fully understood from the following detailed description taken in connection with the appended drawings in which:

FIGURE 1 is a perspective view of a communication system utilizing the present invention;

FIGURE 2 is a partial cross-sectional view of FIGURE 1 along line 2—2;

FIGURE 3 is a diagrammatic top view of one embodiment of the invention;

FIGURE 4 is a diagrammatic top view of a further embodiment of the invention;

Figure 6:
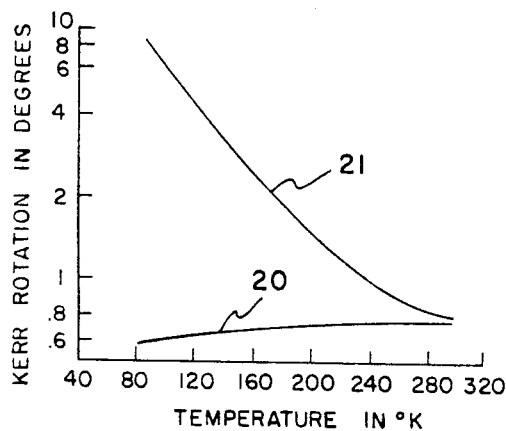
Figure 7:
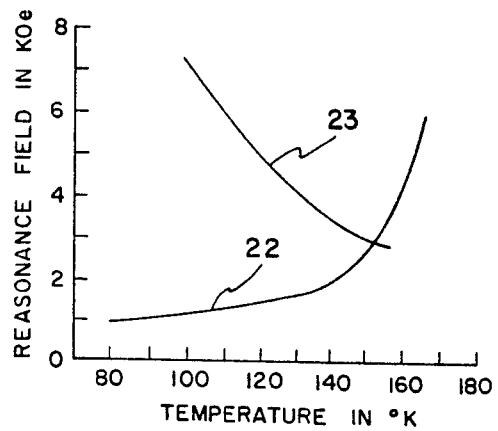

FIGURE 6 is a graphical representation of Kerr rotation of the plane of polarization as a function of temperature at different applied D.C. magnetic fields for reflection from a film of intermetallic manganese-bismuth compound; and FIGURE 7 is a graphical representation of the magnetic field required to produce resonance at 9.02 kilomegacycles as a function of temperature for different orientations of the D.C. magnetic field with respect to the C-axis of crystals of manganese-bismuth in a magnetic film.

The invention can best be understood by reference first to FIGURE 2 which shows a partial cross-sectional view of a magnetic film 10 mounted on a substrate 11. An incident beam of electromagnetic energy 12 strikes the surface of magnetic film 10 and is reflected as beam 13. Incident beam 12 has electric field components $E_1$ and $E_{11}$, and strikes film 10 at an incidence angle $\theta$. Reflected beam 13 has electric field components $E'_1$ and $E'_{11}$ and leaves magnetic film 10 at reflection angle $\theta$. The effect may be observed over a broad range of angles $\theta$. For example, the effect changes very little for $\theta$ in the range of $65° \pm 15°$ when a Permalloy film is used. Magnetic film 10 may be one of several different types which exhibit the magneto-optical Kerr effect. For example, the film may be a Permalloy film or an intermetallic manganese-bismuth film possessing magnetic properties. A satisfactory MnBi film contains equal atomic ratios of manganese and bismuth. Film 10 is preferably single crystal, but may be polycrystalline and can be grown by cooling a melt of the components in the presence of a magnetic field or by cooling from a melt and then annealing the film in the presence of a magnetic field. Thin films of MnBi can also be prepared by vacuum deposition technique such as described by Williams et al., "Magnetic Writing on Thin Films of MnBi," Journal of Applied Physics, vol. 28, No. 10, p. 1181 (October 1957). Film 10 can be grown so that magnetic vectors associated with each crystal are oriented either parallel to, or perpendicular to, the plane in which film 10 lies. The magnetic vectors of the crystals are substantially aligned by application of a magnetic field during production of the film. In this specification, the term film vector will be used to represent either the magnetization vector of a single crystal film or the resultant of the individual crystal magnetization vectors of a polycrystalline film. In FIGURE 2, the film vector of film 10 lies within the plane defined by film 10 and is directed from left to right. A modulating magnetic field may then be applied to film 10 in such a manner as to cause the film vector to change direction slightly. Changing the direction of the film vector will change the magnitudes of the components of reflected beam 13. This change in the components of the electric field of beam 13 results in a slight rotation of the resultant electric field vector. This rotation is called Kerr rotation. If the incident beam is plane polarized, the Kerr rotation is a rotation of the plane of polarization. The modulating magnetic field may be applied at any frequency from zero cycles per second to microwave frequencies. The direction of polarization of the electric field components of the reflected beam 13 will vary at the applied modulating frequency. It can therefore be seen that reflected beam 13 may be modulated in the intensity merely by passing it through an element which transmits only the component of the electric field in one direction. Such elements are well-known and will be called a polarizer when inserted in the path of incident beam 12 and an analyzer when inserted in the path of reflected beam 13.

The Kerr rotation obtained from one reflection is very small for most materials. It has been found that Kerr rotation can be enhanced by multiple reflections from parallel oppositely disposed magnetic films. By proper placement of the films and adjustment of the modulating field, the Kerr rotations from successive reflections can be made additive to give a much larger resultant modulation than could be achieved using a single reflection. This multiple reflection technique is especially useful with films such as Permalloy wherein the Kerr rotation is small.

FIGURE 1 diagrammatically illustrates an optical communications system utilizing the invention. Magnetic film 10 is supported on substrate 11. The direction of the resultant magnetic film vector of film 10 is shown by the film vector lying in the plane of film 10. A means for producing a unidirectional magnetic field, here shown as permanent magnets 14, is positioned so as to produce a magnetic field in a direction parallel the plane of magnetic film 10. This unidirectional field may also be that arising from a direct current activated electromagnet and will thus also be referred to as a D.C. field. A modulating magnetic field producing means 15 is positioned so as to create a modulating field perpendicular to the direction of the D.C. field. Modulating field producing means 15 may be any one of several means such as field coils. The direction of the D.C. field is indicated by a vector labeled D.C. field, and the directions of the modulating field are indicated by a double headed vector labeled modulating field. A wave source 16 emits electromagnetic waves in a beam 12 which passes through a polarizer 17, is reflected from a surface of film 10, passes through an analyzer 18, and is finally detected by a detector 19. Wave source 16 may be a laser, a maser, or any other source of electromagnetic radiation. Polarizer 17 is not necessary to the operation of the system, but improves the intensity modulation. Polarizer 17 may be any means of causing the incident beam 12 to be plane polarized when it reaches a surface of film 10. Analyzer 18 may be any means for passing only plane polarized light. Analyzer 18 may be oriented so as to pass light polarized in the same direction as that transmitted by polarizer 17, or may be rotated so as to pass only light polarized in the plane perpendicular to that passed by polarizer 17. Detector 19 may be a photo multiplier tube or any other means for detecting changes in the intensity of incident electromagnetic wave energy.

The operation of FIGURE 1 can best be described by reference to FIGURE 3 which shows a top view of FIGURE 1 with the source, the polarizers, and the detector omitted. FIGURE 3 illustrates one placement of the D.C. magnetic field and the modulating magnetic field so as to produce resonance mode modulation of the electromagnetic wave. Film 10 should be thick enough so as not to be transparent to the incident beam. Added thickness beyond the skin depth for the frequency of the modulating field will not increase the power loss and so is immaterial in this mode. Permanent magnet 14 is placed so as to create a D.C. field parallel to the film vector. The D.C. field strength tunes the ferromagnetic resonance frequency of the film crystals to the desired frequency. Modulating field producing means 15 is placed so as to produce a modulating field in a direction parallel to the plane of film 10 and perpendicular to the film vector. Application of a modulating field by means 15 then causes deflections of the film vector and resultant modulation of reflected beam 13. Relatively small power is required for a modulating field applied within a bandwidth centering about the resonance frequency.

FIGURE 4 diagrammatically illustrates a modification of FIGURE 3 to achieve digital or switching mode modulation of electromagnetic energy. For this mode of operation, film 10 should be thick enough so as to be opaque to the incident beam, but thin enough to minimize hysteresis losses which are proportional to film volume. An optimum film would be of the order of a few thousand angstroms. Modulating field producing means 15 is positioned to create a modulating field in a direction selectively parallel and anti-parallel to the film vector in the plane of film 10. As the modulating field, which is greater than the switching field, changes direction, the film vector will be induced to flip to the opposite direction in the plane of the film. That is, the film vector wil alternately point from left to right and from right to left depending upon the direction of the modulating field. A small unidirectional magnetic field is created by magnets 14 perpendicular to the film vector to provide a small normal component and facilitate switching of the film vector as the modulating field changes direction. In this mode of operation, reflected beam 13 will have its plane of polarization flipped rapidly back and forth from one extreme to the other.

Figure 5:
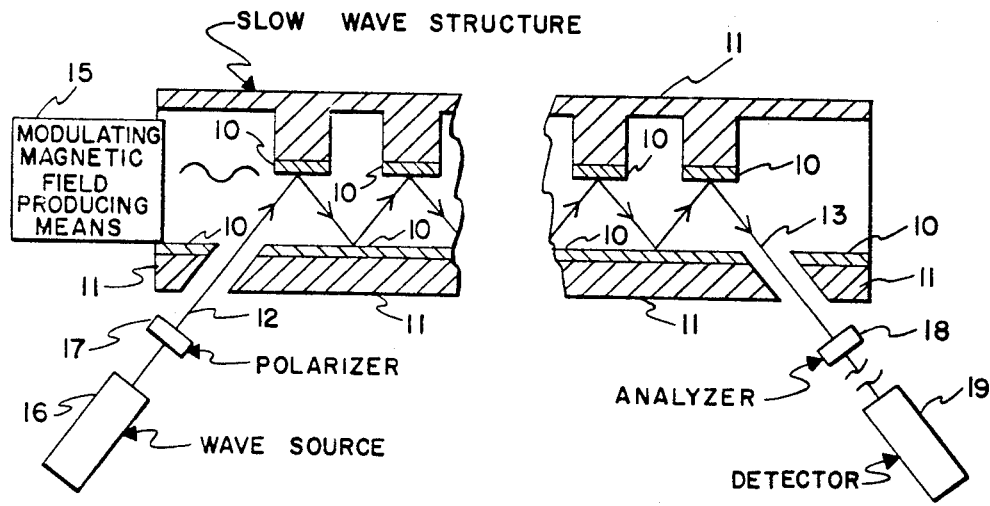
FIGURE 5 is a diagrammatic partial cross-sectional view of another embodiment of the invention in a system.

A further embodiment of the present invention is shown by FIGURE 5. A series of magnetic films 10 are supported by substrate 11 which takes the form of a slow wave structure. Modulating magnetic field producing means 15 may be a microwave source directing the modulating field into the slow wave structure at microwave frequencies. The slow wave structure formed by substrate 11 is constructed to match the velocity of the modulating microwave field through the structure to the horizontal velocity component of beam 12 as it is multiply reflected within the structure. Films 10 are designed so as to provide anti-parallel alignment of the film vectors on the upper and lower films at the time the beam strikes those surfaces, thereby providing additive Kerr rotations upon successive reflections of beam 12. Beam 12 will be attenuated upon each successive reflection. It has been found that for films such as Permalloy, ten reflections is about the optimum number to be utilized in achieving satisfactory modulation with maximum efficiency.

EXAMPLE

In one apparatus utilizing the present invention a helium-neon laser source operating at 6328 A. was used as the wave source. The magnetic film used was a polycrystalline intermetallic manganese-bismuth film with the C-axis of the crystallites oriented perpendicular to the plane of the film. An electromagnet provided the D.C. field, and field coils the modulating field. A commercial polarizer and analyzer were used. The resultant modulation was detected using a photomultiplier tube. Results of some experiments with the apparatus are plotted in FIGURES 6 and 7. Curve 20 in FIGURE 6 is a plot of Kerr rotation of the plane of polarization of the reflected beam as a function of temperature for a film in the remanent state. Curve 21 is a plot of Kerr rotation over the same temperature range with a saturating magnetic field applied to the film. These curves represent maximum rotation at that temperature. It can readily be seen from curve 21 that an extremely large Kerr rotation is possible using intermetallic manganese-bismuth at low temperatures. A Kerr rotation of 10° represents a modulation in the intensity of the analyzed reflected light of approximately 17%.

Curve 22 in FIGURE 7 represents the applied D.C. field required to obtain ferromagnetic resonance in manganese-bismuth crystallites as a function of temperature with the field applied perpendicular to the C-axis of the crystallites. Curve 22 is for a ferromagnetic resonance frequency of 9.02 kilomegacycles. Curves for other resonance frequencies would consist of a set of curves similar to curve 22 and displaced on the vertical axis. Curve 23 is a plot of the D.C. field required to obtain ferromagnetic resonance at 9.02 kilomegacycles as a function of temperature when the field is applied parallel to the C-axis of the crystallites. Again, a set of similar curves would define the function for other resonance frequencies. For a single crystal manganese-bismuth film in the resonance condition, a modulating field at the resonance frequency requires only a few watts of power to provide the maximum modulation.

It can readily be seen by those skilled in the art that many modifications of the invention are possible. For example, the D.C. and modulating magnetic field may be applied perpendicular to the plane of the film. Many different materials may be used for the magnetic film. The polarizer for polarizing the incident beam is not required. The apparatus can also be operated without the D.C. magnetic field. I, therefore, intend that my invention be limited only by the scope of the appended claims.

I claim:
1. A modulator for continuously modulating electromagnetic waves comprising:
   a substantial planar ferromagnetic film having a resultant ferromagnetic film vector substantially parallel to the plane of said film;
   means for applying a unidirectional magnetic field to said film in a direction parallel to the plane of said film and said film vector to tune said film vector to a desired ferromagnetic resonant frequency; and
   means for applying a modulating magnetic field to said film in a direction parallel to the plane of said film and perpendicular to said unidirectional magnetic field.

2. An optical communication system comprising:
   a source of electromagnetic energy;

means for polarizing a beam of electromagnetic energy emanating from said source;

a substantially planar ferromagnetic film, positioned to reflect said polarized beam, said film having a resultant ferromagnetic film vector substantially parallel to the plane of said film;

means for applying a unidirectional magnetic field to said film in a direction parallel to the plane of said film and said film vector to tune said film vector to a desired ferromagnetic resonant frequency;

means for applying a modulating magnetic field to said film in a direction parallel to the plane of said film and perpendicular to said unidirectional magnetic field;

means for analyzing a reflected portion of said beam; and means for detecting variations in the intensity of said analyzed portion.

3. A modulator for continuously modulating electromagnetic waves comprising:

a thin magnetic film having a resultant magnetic film vector;

field means positioned to interact with the film to establish a resonant vibration frequency for the film vector; and field means constructed and arranged to vibrate the film vector in accordance with a modulation signal whose frequency lies within a bandwidth of frequency including the resonant frequency.

References Cited

UNITED STATES PATENTS

| 2,984,825 | 5/1961 | Fuller et al. | 88—61 |
| 3,142,720 | 7/1964 | Adams | 88—61 |
| 3,224,333 | 12/1965 | Kolk et al. | 88—61 |
| 3,229,273 | 1/1966 | Baaba et al. | 88—61 |

OTHER REFERENCES

Pugh: IBM Technical Disclosure Bul., vol. 4, No. 8, January 1962, p. 57.

Van Nostrand: International Dictionary of Physics and Electronics, Magnetic Resonance, 1961, p. 987.

Van Nostrand: International Dictionary of Physics and Electronics, Magnetic Resonance Spectrum, 1961, p. 1071.

ROBERT L. GRIFFIN, *Primary Examiner.*

A. MAYER, *Assistant Examiner.*

U.S. Cl. X.R.

350—160